US012602979B2

(12) United States Patent
Yamanushi et al.

(10) Patent No.: US 12,602,979 B2
(45) Date of Patent: Apr. 14, 2026

(54) INFORMATION PROCESSING DEVICE

(71) Applicant: PIONEER CORPORATION, Tokyo (JP)

(72) Inventors: Seiji Yamanushi, Tokyo (JP); Kazuki Doi, Tokyo (JP); Manabu Suzuki, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/690,096

(22) PCT Filed: Jan. 31, 2022

(86) PCT No.: PCT/JP2022/003627

§ 371 (c)(1),
(2) Date: Mar. 7, 2024

(87) PCT Pub. No.: WO2023/145084

PCT Pub. Date: Aug. 3, 2023

(65) Prior Publication Data

US 2024/0362986 A1 Oct. 31, 2024

(51) Int. Cl.
*G08B 21/00* (2006.01)
*G08B 21/02* (2006.01)
*G08B 25/10* (2006.01)

(52) U.S. Cl.
CPC ............. *G08B 21/02* (2013.01); *G08B 25/10* (2013.01)

(58) Field of Classification Search
CPC ......... G08B 21/02; G08B 25/10; G08B 25/00
USPC .......................................................... 340/665
See application file for complete search history.

(56) References Cited

U.S. PATENT DOCUMENTS 9,672,719 B1 * 6/2017 Hollenstain ............ G08B 21/18
9,689,887 B1 * 6/2017 Srinivas ................. G01C 15/00
10,728,378 B1 7/2020 Waris et al.
2010/0121226 A1 5/2010 Ten et al.
2013/0017847 A1 * 1/2013 Doherty .................. H04W 4/00 455/567
2014/0253284 A1 * 9/2014 Peterson ............... H04M 1/185 340/3.1
2017/0109990 A1 * 4/2017 Xu ..................... G08B 21/0446
2018/0033220 A1 * 2/2018 Pal ....................... G07C 5/0866
2019/0130660 A1 5/2019 Schmitt
2019/0283668 A1 9/2019 Sasaki
(Continued)

FOREIGN PATENT DOCUMENTS

EP 3606018 A1 2/2020
JP 2010525443 A 7/2010
(Continued)

OTHER PUBLICATIONS

Office Action, issued in Japanese Patent Application No. 2023-576592 dated Nov. 5, 2024.
(Continued)

*Primary Examiner* — Tai T Nguyen
(74) *Attorney, Agent, or Firm* — NIXON & VANDERHYE

(57) ABSTRACT

Unnecessary notification is reduced. Occurrence of an impact in an information processing device is detected, a cause of the impact is determined, and when it is determined that the cause of the impact is a drop of the information processing device, notification regarding the impact is not performed.

5 Claims, 8 Drawing Sheets

(56) References Cited

U.S. PATENT DOCUMENTS

| | | | | |
|---|---|---|---|---|
| 2021/0112153 | A1 | 4/2021 | Nagao | |
| 2023/0029857 | A1* | 2/2023 | Goel | G06Q 10/04 |

FOREIGN PATENT DOCUMENTS

| | | | |
|---|---|---|---|
| JP | 2017046125 | A | 3/2017 |
| JP | 2017087812 | A | 5/2017 |
| JP | 2019165293 | A | 9/2019 |
| JP | 2019197431 | A | 11/2019 |
| JP | 2020108125 | A | 7/2020 |
| JP | 2021083095 | A | 5/2021 |
| WO | 2018180198 | A1 | 10/2018 |

OTHER PUBLICATIONS

Extended European Search Report, issued in European Patent Application No. 22923947.0 dated Oct. 29, 2025.

International Search Report for PCT/JP2022/003627, mailed Mar. 15, 2022, 4 pages.

Written Opinion of the ISA for PCT/JP2022/003627, mailed Mar. 15, 2022, 4 pages.

* cited by examiner

INFORMATION PROCESSING DEVICE

This application is the U.S. national phase of International Application No. PCT/JP2022/003627 filed Jan. 31, 2022, which designated the U.S., the entire contents of which is hereby incorporated by reference.

TECHNICAL FIELD

The present invention relates to an information processing device.

BACKGROUND ART

There is a service in which, when an accident occurs in a vehicle, a device (a drive recorder or a smartphone) attached to the vehicle automatically transmits information regarding the accident (accident information) to an external device, and automatically makes a call to a call center to enable a call with an operator of the call center (for example, Patent Document 1). In such a service, for example, when acceleration measured by an acceleration sensor exceeds a predetermined value, the device attached to the vehicle determines that an impact due to the accident of the vehicle has occurred, automatically transmits accident information to the external device, and calls the call center.

CITATION LIST

Patent Document

Patent Document 1: JP 2017-46125A

SUMMARY OF INVENTION

Technical Problem

For example, the drive recorder is attached to a windshield or a rear glass of the vehicle by an attachment part such as a double-sided tape or a sucker. Due to vibration during traveling or the like, an attached state may deteriorate, and the drive recorder may deviate from an attached portion and drop. After dropping, the drive recorder collides with an object such as a dashboard or a floor, and an impact is generated in the drive recorder. Even in such an impact caused by the drop of the drive recorder, the acceleration measured by the acceleration sensor included in the drive recorder may exceed the predetermined value. In such a case, even though no accident has occurred in the vehicle, the drive recorder automatically transmits accident information to the external device and calls the call center.

An example of the problem to be solved by the present invention is to reduce unnecessary notification.

Solution to Problem

In order to solve the above problem, the invention according to claim 1 is an information processing device attached to a moving body, the information processing device including: an impact detection unit that detects occurrence of an impact in the information processing device; an impact cause determination unit that determines a cause of the impact; and a notification processing unit that issues a notification to the outside, in which the notification processing unit does not issue the notification regarding the impact when it is determined that the cause of the impact is a drop of the information processing device.

The invention is an information processing method executed by an information processing device attached to a moving body, the method including: an impact detection step of detecting occurrence of an impact in the information processing device; an impact cause determination step of determining a cause of the impact; and a notification processing step of notifying an outside, wherein when it is determined in the impact cause determination step that the impact has occurred due to a drop of the information processing device, notification regarding the impact is not automatically performed in the notification processing step.

An information processing program causes a computer to execute the information processing method.

The information processing program is stored.

DESCRIPTION OF EMBODIMENTS

Figure 1:
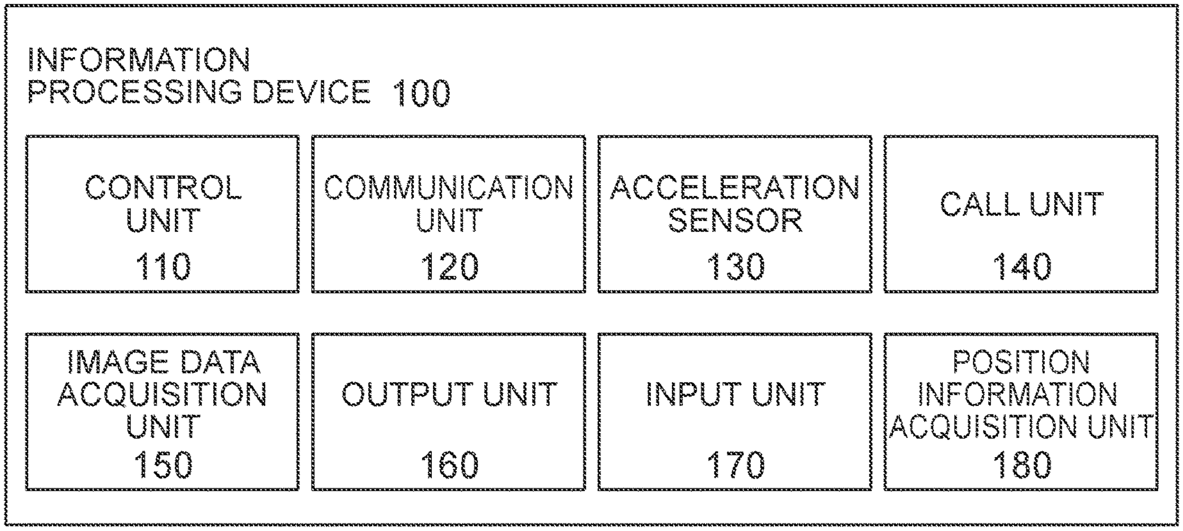
FIG. 1 is an information processing device 100 according to an embodiment of the present invention.

An information processing device according to an embodiment of the present invention is an information processing device attached to a moving body, including: an impact detection unit that detects occurrence of an impact in the information processing device; an impact cause determination unit that determines a cause of the impact; and a notification processing unit that issues a notification to an outside, in which the notification processing unit issues no notification regarding the impact when it is determined that the cause of the impact is a drop of the information processing device. Therefore, in the present embodiment, unnecessary notifications can be reduced. In addition, in a case where the notification to the outside includes transmission of the accident information to an external device, the accident information is not transmitted to the external device, and unnecessary communication can be reduced.

The impact cause determination unit is preferable to determine that the cause of the impact is the drop of the information processing device when occurrence of the drop of the information processing device is detected immediately before occurrence of the impact. This makes it possible to accurately determine the cause of the impact.

The notification processing unit may issue a notification regarding the impact when it is determined that the cause of the impact is an accident of the moving body. The impact cause determination unit may determine that the cause of the impact is an accident of the moving body when occurrence of the drop of the information processing device is not detected immediately before occurrence of the impact. In this way, it is possible to hold a request for rescuing an occupant of the moving body and information regarding an accident in the external device.

There may be further provided with a confirmation information output processing unit that outputs information regarding confirmation as to whether to issue a notification when it is determined that the cause of the impact is the drop of the information processing device. A response information acquisition processing unit that acquires information regarding a response to the confirmation may be provided, and when the response includes a predetermined response, the notification processing unit may perform notification according to the response. With this configuration, when it is determined that the cause of the impact is the drop of the information processing device, it is possible to issue a notification to the outside after confirming with the user whether to make the notification.

Furthermore, an information processing method according to an embodiment of the present invention is an information processing method executed by an information processing device attached to a moving body, the method including: an impact detection step of detecting occurrence of an impact in the information processing device; an impact cause determination step of determining a cause of the impact; and a notification processing step of notifying an outside, in which when it is determined in the impact cause determination step that the impact has occurred due to a drop of the information processing device, notification regarding the impact is not automatically performed in the notification processing step. Therefore, in the present embodiment, unnecessary notifications can be reduced. In addition, in a case where the notification to the outside includes transmission of the accident information to an external device, the accident information is not transmitted to the external device, and unnecessary communication can be reduced.

Furthermore, an information processing program according to an embodiment of the present invention causes a computer to execute the information processing method described above. This makes it possible to reduce unnecessary notifications using a computer.

In addition, a computer-readable storage medium according to an embodiment of the present invention stores the above-described information processing program. In this way, the information processing program described above can be distributed alone in addition to being incorporated in a device, and version upgrade or the like can be easily performed.

EMBODIMENT

<Information Processing Device 100>

FIG. 1 is an information processing device 100 according to an embodiment of the present invention. The information processing device 100 includes a control unit 110, a communication unit 120, an acceleration sensor 130, a call unit 140, an image data acquisition unit 150, an output unit 160, an input unit 170, and a position information acquisition unit 180.

The control unit 110 includes, for example, a computer. The communication unit 120 is a communication device for transmitting and receiving information to and from another device. The acceleration sensor 130 is a device for measuring a magnitude and a direction of acceleration, such as a three-axis acceleration sensor. The call unit 140 is a device for making a call through a telephone network. The image data acquisition unit 150 is a device for acquiring image data such as a camera. The output unit 160 is an output device for outputting information such as a display and a speaker. The input unit 170 is an input device for receiving input of information such as a switch, a keyboard, a touch panel, a microphone, and a camera. The position information acquisition unit 180 is a device for acquiring position information such as an antenna that receives a signal transmitted from a satellite configuring a global navigation satellite system (GNSS) including a global positioning system (GPS).

Figure 2A:
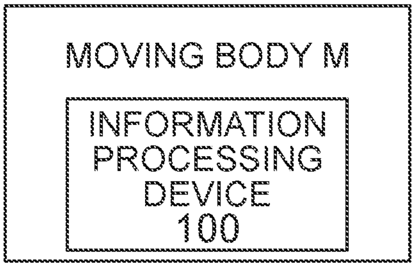
FIG. 2A is a diagram illustrating a relationship between the information processing device 100 and a moving body M.
Figure 2B:
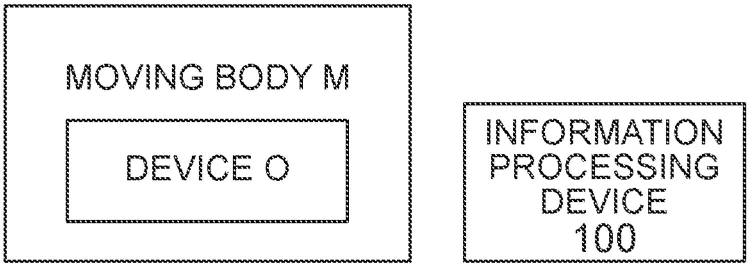
FIG. 2B is a diagram illustrating a relationship between the information processing device 100 and a moving body M.

The information processing device 100 may be a device (for example, a drive recorder or a smartphone) attached to the moving body M such as a vehicle as illustrated in FIG. 2A, or may be a server device installed outside the moving body M that communicates with a device O attached to the moving body M as illustrated in FIG. 2B. In a case where the information processing device 100 is a server device installed outside the moving body that communicates with a device attached to the moving body, the information processing device 100 may not include the acceleration sensor 130, the call unit 140, the image data acquisition unit 150, the output unit 160, the input unit 170, and the position information acquisition unit 180.

In a case where the information processing device 100 is a device O attached to the moving body, the information processing device 100 is preferable to include a beacon and a smartphone. At this time, for example, the beacon is preferable to include the acceleration sensor 130, and the smartphone is preferable to include the communication unit 120, the call unit 140, the image data acquisition unit 150, the output unit 160, the input unit 170, and the position information acquisition unit 180. Some of the functions of the control unit 110 is preferable to be provided by the beacon, and the remaining functions may be provided by the smartphone.

Figure 3:
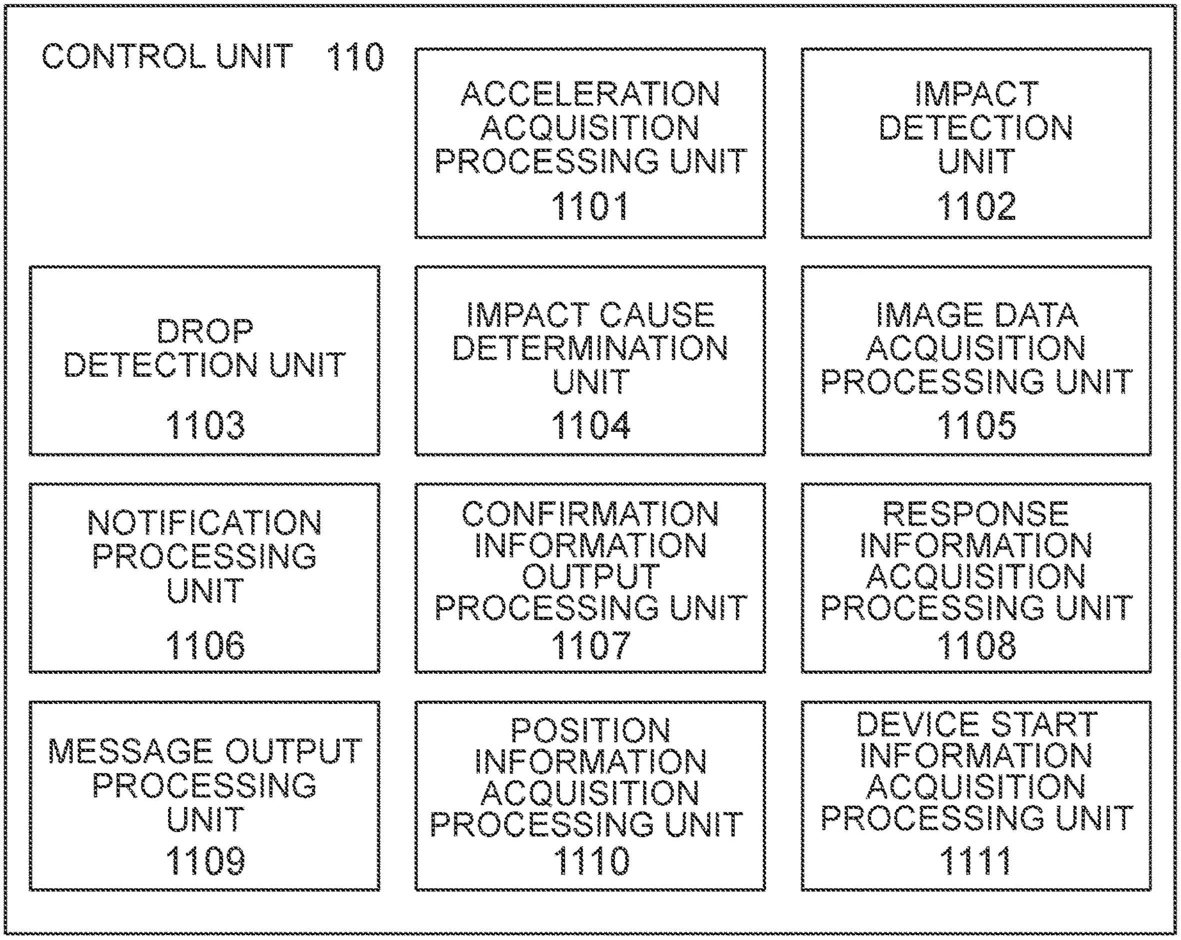
FIG. 3 is a diagram illustrating a control unit 110.

FIG. 3 is a diagram illustrating the control unit 110. The control unit 110 includes an acceleration acquisition processing unit 1101, an impact detection unit 1102, a drop detection unit 1103, and an impact cause determination unit 1104.

The acceleration acquisition processing unit 1101 acquires acceleration measured by an acceleration sensor of a device attached to the moving body. For example, in a case where the information processing device 100 is a device attached to the moving body, the acceleration acquisition processing unit 1101 acquires acceleration measured by the acceleration sensor 130. On the other hand, for example, in a case where the information processing device 100 is a server device installed outside the moving body that communicates with a device attached to the moving body, the acceleration acquisition processing unit 1101 acquires the acceleration measured by the acceleration sensor of the device attached to the moving body by performing communication using the communication unit 120.

Hereinafter, the acceleration sensor of the device attached to the moving body is referred to as an in-vehicle acceleration sensor. In a case where the information processing device 100 is a device attached to the moving body, the in-vehicle acceleration sensor is the acceleration sensor 130. In a case where the information processing device 100 is a server device installed outside the moving body that communicates with the device attached to the moving body, the in-vehicle acceleration sensor is an acceleration sensor included in the device attached to the moving body.

The impact detection unit 1102 detects the occurrence of an impact in the in-vehicle acceleration sensor on the basis of the acceleration acquired by the acceleration acquisition processing unit 1101. For example, in a case where the information processing device 100 is a device attached to the moving body, the impact detection unit 1102 detects the occurrence of an impact in the acceleration sensor 130, that is, the occurrence of an impact in the information processing device 100. On the other hand, for example, in a case where the information processing device 100 is a server device installed outside the moving body that communicates with a device attached to the moving body, the impact detection unit 1102 detects the occurrence of an impact in an acceleration sensor of the device attached to the moving body, that is, the occurrence of an impact in the device attached to the moving body. For example, the impact detection unit 1102 determines that an impact has occurred when the magnitude of the acceleration acquired by the acceleration acquisition processing unit 1101 exceeds a predetermined value.

The drop detection unit 1103 detects occurrence of a drop of the in-vehicle acceleration sensor. For example, in a case where the information processing device 100 is a device attached to the moving body, the drop detection unit 1103 detects the occurrence of the drop of the acceleration sensor 130, that is, the occurrence of the drop of the information processing device 100. On the other hand, for example, in a case where the information processing device 100 is a server device installed outside the moving body that communicates with a device attached to the moving body, the drop detection unit 1103 detects the occurrence of the drop of the acceleration sensor of the device attached to the moving body, that is, the occurrence of the drop of the device attached to the moving body.

The impact cause determination unit 1104 determines the cause of the impact detected by the impact detection unit 1102. When the in-vehicle acceleration sensor drops, immediately after that, the in-vehicle acceleration sensor collides with an object such as a dashboard, and an impact is generated in the in-vehicle acceleration sensor. Therefore, the impact detected immediately after the drop of the in-vehicle acceleration sensor is considered to be an impact due to the drop of the in-vehicle acceleration sensor. Therefore, in the present embodiment, when the occurrence of the drop of the in-vehicle acceleration sensor is detected immediately before the occurrence of the impact, the impact cause determination unit 1104 determines that the cause of the impact is the drop of the in-vehicle acceleration sensor. For example, when the occurrence of the drop of the in-vehicle acceleration sensor is detected within a predetermined time before the occurrence of the impact, it is determined that the cause of the impact is the drop of the in-vehicle acceleration sensor.

As described above, in the present embodiment, it is possible to determine whether or not the cause of the detected impact is the drop of the in-vehicle acceleration sensor. Therefore, for example, it is possible to reduce unnecessary notification by making no notification to the outside at the time of impact due to drop of the in-vehicle acceleration sensor.

A large acceleration caused by a cause other than the drop of the in-vehicle acceleration is likely to be caused by an impact due to an accident of the moving body. Therefore, for example, if the occurrence of drop of the in-vehicle acceleration sensor is not detected immediately before the occurrence of the impact, the impact cause determination unit 1104 is preferable to determine that the cause of the impact is an accident of the moving body.

<Detection of Drop>

Figure 4:
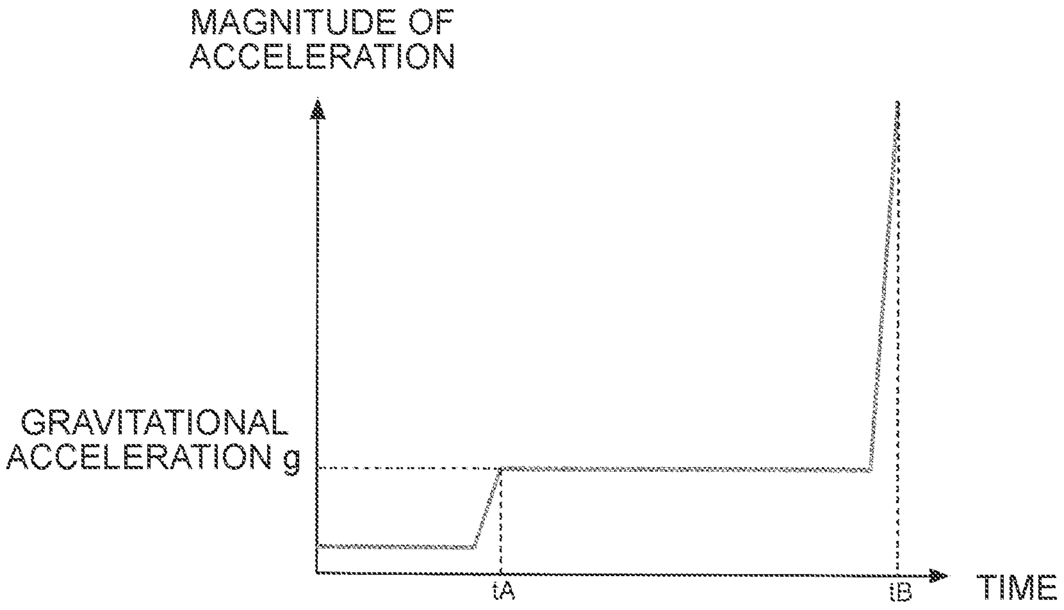
FIG. 4 is a diagram illustrating a change in magnitude of acceleration when a device attached to a moving body drops.

FIG. 4 is a diagram illustrating a change in magnitude of acceleration when a device attached to the moving body drops. In FIG. 4, a horizontal axis represents time, and a vertical axis represents magnitude of acceleration. In FIG. 4, the drop starts at time tA, and collides with an object such as a dashboard and an impact occurs at time tB. Since the device attached to the moving body freely drops between the time tA and the time tB, the magnitude of the acceleration becomes a value close to the gravitational acceleration g.

Therefore, the drop detection unit 1103 of the control unit 110 in the information processing device 100 according to an embodiment of the present invention detects the occurrence of the drop of the in-vehicle acceleration sensor on the basis of the magnitude of the acceleration acquired by the acceleration acquisition processing unit 1101. For example, if a period in which the magnitude of the acceleration is close to the gravitational acceleration g is equal to or more than a predetermined threshold, the drop detection unit 1103 determines that the drop of the in-vehicle acceleration sensor has occurred in this period. Therefore, in the present embodiment, it is possible to accurately detect the occurrence of the drop of the in-vehicle acceleration sensor.

The information processing device 100 may include an image data acquisition processing unit 1105 that acquires image data around the in-vehicle acceleration sensor (that is, a periphery of the device attached to the moving body). Then, the drop detection unit 1103 may detect the occurrence of the drop of the in-vehicle acceleration sensor on the basis of the magnitude of the acceleration acquired by the acceleration acquisition processing unit 1101 and the image data acquired by the image data acquisition processing unit 1105. In this way, it is possible to detect the occurrence of the drop of the in-vehicle acceleration sensor on the basis of not only a change in the magnitude of the acceleration but also a change in scenery around the acceleration sensor (for example, a change in a position of a window frame of a windshield or the like). This makes it possible to more accurately detect the occurrence of the drop of the in-vehicle acceleration sensor.

The drop detection unit 1103 may constantly detect the occurrence of the drop of the in-vehicle acceleration sensor, or may detect the occurrence of the drop of the in-vehicle acceleration sensor only when the occurrence of the impact is detected by the impact detection unit 1102.

For example, when the occurrence of the impact is detected by the impact detection unit 1102, the drop detection unit 1103 is preferable to detect the occurrence of the drop of the in-vehicle acceleration sensor on the basis of the magnitude of the acceleration measured by the in-vehicle acceleration sensor before the occurrence of the impact. With this configuration, it is not necessary to constantly detect the occurrence of the drop of the in-vehicle acceleration sensor.

In a case where the information processing device 100 is a server device installed outside the moving body that communicates with a device attached to the moving body, the control unit 110 may not include the impact detection unit 1102. In this case, the device attached to the moving body is preferable to have the function of the impact detection unit 1102. Then, when a device attached to the moving body detects an impact in the in-vehicle acceleration sensor, information indicating that the occurrence of the impact has been detected may be transmitted to the information processing device 100, and when the drop detection unit 1103 of the information processing device 100 receives information indicating that the occurrence of the impact has been detected by the communication unit 120, the occurrence of the drop of the in-vehicle acceleration sensor may be detected on the basis of the magnitude of the acceleration measured by the in-vehicle acceleration sensor before the occurrence of the impact, and the impact cause determination unit 1104 is preferable to determine the cause of the impact.

<Notification to Outside>

In a case where the cause of the impact is an accident, the information processing device 100 automatically issues a notification to the outside, so that it is possible to hold a request for rescue of an occupant of the moving body and information regarding the accident in an external device. Therefore, the control unit 110 of the information processing device 100 according to an embodiment of the present invention further includes a notification processing unit 1106 that issues a notification to the outside. Then, when it is determined that the cause of the impact is an accident of the moving body, the notification processing unit 1106 automatically issues a notification.

Figure 5:
FIG. 5 is a diagram illustrating transmission of accident information by a notification processing unit 1106.

The notification to the outside by the notification processing unit 1106 is preferable to include, for example, transmission of image data before and after the impact and information (accident information) such as position information, speed information, and acceleration information of the moving body to an external device. At this time, for example, as illustrated in FIG. 5, the notification processing unit 115 transmits the accident information to the external device by the communication unit 120. This makes it possible to transmit accident information to a rescue organization or the like, store the accident information, and analyze an accident cause or the like on the basis of the accident information by an external device.

Figure 6A:
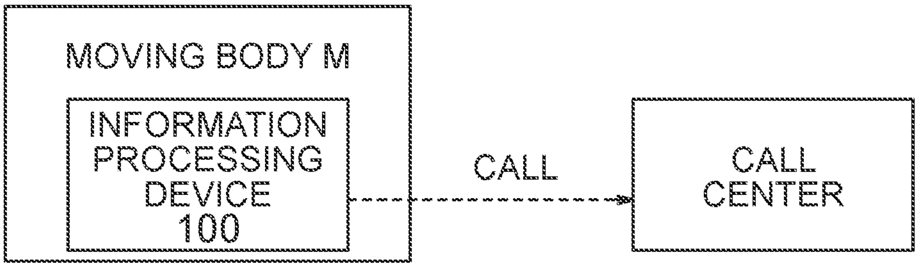
FIG. 6A is a diagram illustrating a call by the notification processing unit 1106.
Figure 6B:
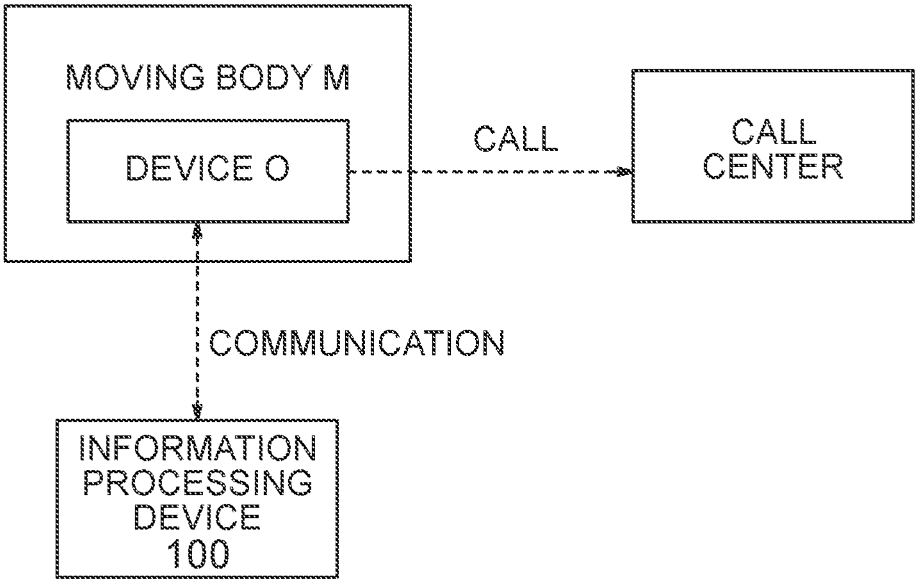
FIG. 6B is a diagram illustrating a call by the notification processing unit 1106.

Furthermore, the notification to the outside by the notification processing unit 1106 may include an outgoing call to a call center by a call unit of a device attached to the moving body in which the impact has occurred. At this time, for example, as illustrated in FIG. 6A and FIG. 6B, the notification processing unit 1106 causes the call unit of a device attached to the moving body in which the impact has occurred to make a call to the call center. In a case where the information processing device 100 is a device attached to a moving body, the notification processing unit 1106 causes the call unit 140 to make a call to the call center as illustrated in FIG. 6A. On the other hand, for example, in a case where the information processing device 100 is a server device installed outside the moving body that communicates with the device O attached to the moving body M, the notification processing unit 1106 performs communication using the communication unit 120 as illustrated in FIG. 6B, thereby making a call to the call center by the call unit of the device O attached to the moving body M. As a result, the driver of the moving body can talk with an operator of the call center.

When the cause of the impact is the drop of the in-vehicle acceleration sensor, it is not always necessary to issue a notification the outside. Therefore, in the present embodiment, the notification processing unit 1106 does not automatically issue a notification when it is determined that the cause of the impact is the drop of the in-vehicle acceleration sensor.

Therefore, in the present embodiment, it is possible to reduce unnecessary notifications. In addition, in a case where the notification to the outside includes transmission of the accident information to an external device, transmission of the accident information to the external device is not performed, and unnecessary communication can also be reduced. In particular, in a case where the information processing device 100 is a device attached to the moving body, transmission of accident information to the external device is not performed at all, and unnecessary communication can be further reduced.

Even when the cause of the impact is the drop of the in-vehicle acceleration sensor, it may be necessary to issue a notification to the outside. Therefore, the notification processing unit 1106 may transmit information indicating that the in-vehicle acceleration sensor has dropped to the external device.

Furthermore, the control unit 110 may further include a confirmation information output processing unit 1107 and a response information acquisition processing unit 1108.

When it is determined that the cause of the impact is the drop of the in-vehicle acceleration sensor, the confirmation information output processing unit 1107 outputs confirmation information including information regarding confirmation as to whether or not to issue a notification. At this time, in a case where the information processing device 100 is a device attached to the moving body, the confirmation information output processing unit 1107 outputs the confirmation information by the output unit 160, for example. On the other hand, in a case where the information processing device 100 is a server device installed outside the moving body that communicates with a device attached to the moving body, the confirmation information output processing unit 1107 outputs the confirmation information by an output device (for example, a display or a speaker) of the device attached to the moving body by performing communication using the communication unit 120, for example.

The response information acquisition processing unit 1108 acquires response information including information regarding a response to confirmation as to whether or not to issue a notification. At this time, in a case where the information processing device 100 is a device attached to the moving body, the response information acquisition processing unit 1108 acquires the response information input by the input unit 170, for example. On the other hand, in a case where the information processing device 100 is a server device installed outside the moving body that communicates with a device attached to the moving body, the response information acquisition processing unit 1108 acquires response information input by an input device (for example, a switch, a keyboard, a touch panel, a microphone, or a camera) of the device attached to the moving body by performing communication using the communication unit 120, for example.

Then, if the response to the confirmation as to whether or not to issue a notification includes a predetermined response, the notification processing unit 1106 issues a notification according to the response. With this configuration, when it is determined that the cause of the impact is the drop of the in-vehicle acceleration sensor, it is possible to issue a notification to the outside after confirming with the user whether or not to make the notification.

For example, if the response includes a response of "make no notification", the notification processing unit 1106 is preferable to not to issue a notification to the outside. Furthermore, if the response includes a response of "issue a notification", the notification processing unit 1106 is preferable to issue a notification to the outside. Furthermore, if the response includes a response of "transmit information regarding impact", the notification processing unit 1106 is preferable to transmit information such as images before and after the impact, position information of the moving body, speed information, acceleration information, and the like to an external device. In addition, when the response includes a response of "calling", the notification processing unit 1106 is preferable to cause the call unit of the device attached to the moving body in which the impact has occurred to make a call to the call center.

Furthermore, as the confirmation information, information regarding confirmation as to whether or not to drop may be output. Then, the response information is preferable to include information regarding a response to a confirmation as to whether or not to drop, and if the response to the confirmation as to whether or not to drop includes a predetermined response, the notification processing unit 1106 is preferable to perform notification according to the response. For example, if the response includes a response of "dropping", the notification processing unit 1106 is preferable to transmit information indicating that the in-vehicle acceleration sensor has dropped to the external device. Furthermore, in a case where the response includes a response of "not dropping" or in a case where there is no response, there is a possibility that an accident has occurred in the moving body. Therefore, if the response includes a response of "not dropping", or if there is no response, the notification processing unit 1106 may issue a notification to the outside.

<Prompting Replacement of Attachment Member>

Even if an attachment state to the moving body of a device (that is, a device including an in-vehicle acceleration sensor) attached to the moving body deteriorates and the device is reattached to the moving body, the device attached to the moving body may be repeatedly dropped. In such a case, it is better to replace the attachment part. Therefore, the control unit 110 of the information processing device 100 according to an embodiment of the present invention further includes a message output processing unit 1109.

When the occurrence of dropping of the device attached to the moving body is repeatedly detected, the message output processing unit 1109 outputs information regarding a message prompting replacement of an attachment part for attaching the device attached to the moving body to the moving body. At this time, in a case where the information processing device 100 is a device attached to the moving body, the message output processing unit 1109 outputs a message prompting replacement of an attachment part by the output unit 160, for example. On the other hand, in a case where the information processing device 100 is a server device installed outside the moving body that communicates with a device attached to the moving body, the confirmation information output processing unit 1107 outputs a message prompting replacement of the attachment part by an output device (for example, a display or a speaker) of the device attached to the moving body by performing communication using the communication unit 120, for example. In addition, the message output processing unit 1109 may cause the communication unit 120 to transmit an electronic mail with contents for prompting replacement of the attachment part to a user (for example, an owner or manager of the moving body) of the moving body.

As described above, in the present embodiment, when the attachment state of the device attached to the moving body deteriorates, it is possible to prompt the user of the moving body to replace the attachment member. Therefore, in the present embodiment, it is possible to reduce a drop of a device attached to the moving body. This makes it possible to reduce detection of an impact due to a drop of the acceleration sensor attached to the moving body, and makes it possible to reduce unnecessary notification.

For example, when detection of a drop of the in-vehicle acceleration sensor has been performed a predetermined number of times within a predetermined period, the message output processing unit 1109 determines that a drop of the device has been repeatedly detected. At this time, the predetermined period is preferable to be determined on the basis of, for example, a use situation of the moving body. In this way, the degree of deterioration of the attachment member can be determined according to the use situation of the moving body.

For example, with use of the measurement history of the in-vehicle acceleration sensor, it is possible to know a time during which the moving body is used. Therefore, the use state of the moving body is preferable to be determined on the basis of the measurement history of the in-vehicle acceleration sensor.

In addition, it is also possible to know the time during which the moving body is used by using the information regarding the position of the moving body. Therefore, the information processing device 110 may further include a moving body position information acquisition processing unit 1110 that acquires moving body position information including information regarding the position of the moving body, and the use situation of the moving body may be determined on the basis of the moving body position information. For example, in a case where the information processing device 100 is a device attached to a moving body, the moving body position information acquisition processing unit 1110 acquires the moving body position information using the position information acquisition unit 180. On the other hand, for example, in a case where the information processing device 100 is a server device installed outside the moving body that communicates with a device attached to the moving body, the moving body position information acquisition processing unit 1110 acquires the moving body position information using the position information acquisition unit of the device attached to the moving body by performing communication using the communication unit 120.

Generally, an in-vehicle device such as a drive recorder is activated by turning on an accessory power supply (ACC power supply) of the moving body. That is, it is possible to know the time during which the moving body is used by using the information regarding the activation of the device attached to the moving body. Therefore, the information processing device 110 may further include a device activation information acquisition processing unit 1111 that acquires device activation information including information regarding activation of a device attached to the moving body, and the use situation of the moving body may be determined on the basis of the device activation information.

Figure 7:
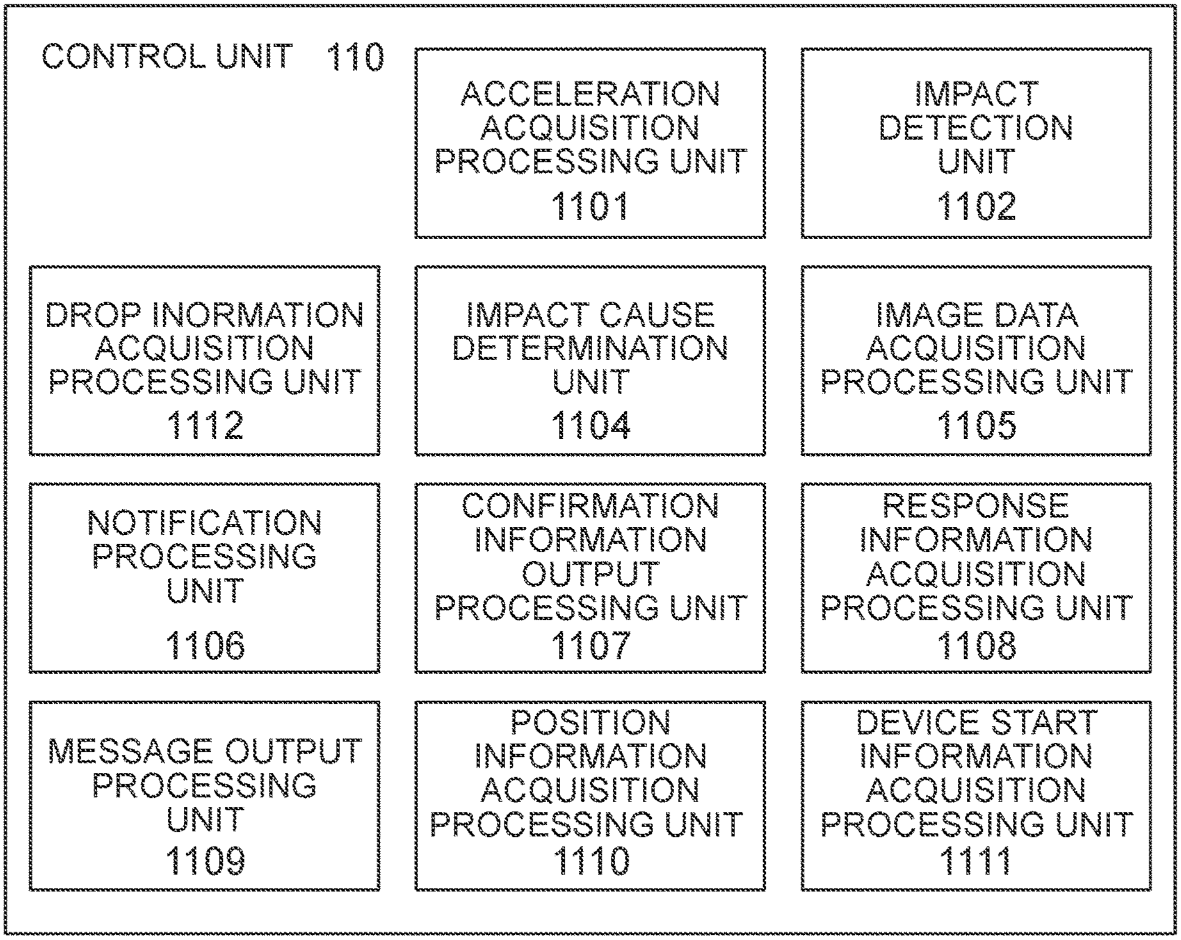
FIG. 7 is a diagram illustrating the control unit 110.

As illustrated in FIG. 7, the control unit 110 of the information processing device 100 may include a drop information acquisition processing unit 1112 that acquires information regarding occurrence of a drop of the acceleration sensor from another device (for example, a device attached to the moving body) using communication by the communication unit 120, instead of the drop detection unit 1103. Then, the message output processing unit 1109 may determine whether or not the drop of the acceleration sensor is repeatedly detected on the basis of the information regarding the occurrence of the drop of the acceleration sensor. This eliminates a need for the information processing device 100 to have a function of detecting the occurrence of the drop of the in-vehicle acceleration sensor.

<Processing Operation in Control Unit 110>

Figure 8:
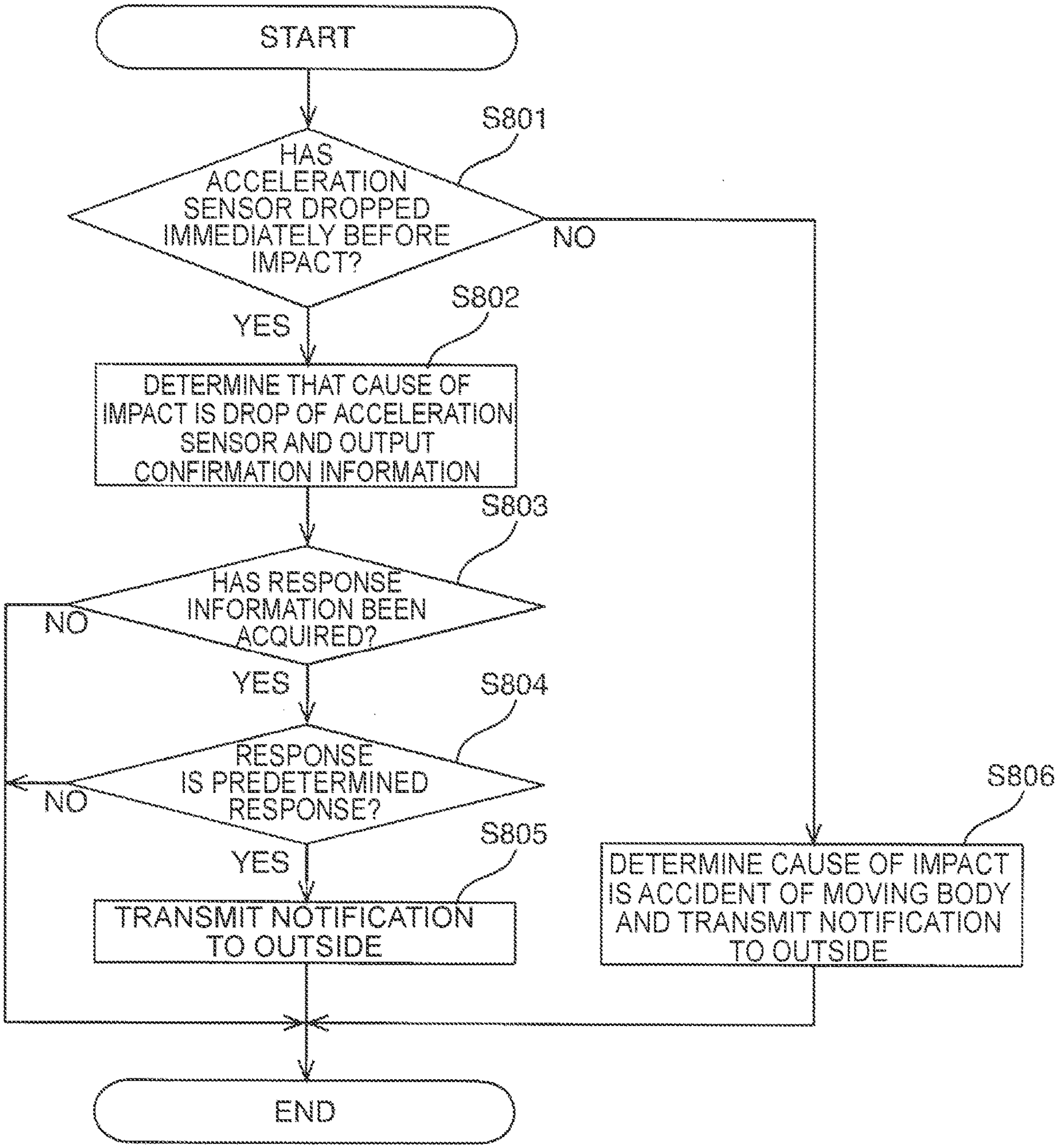
FIG. 8 is an example of a processing operation executed in the control unit 110 when occurrence of an impact is detected.

FIG. 8 is an example of a processing operation executed in the control unit 110 when occurrence of an impact is detected. The impact cause determination unit 1104 confirms whether or not the occurrence of the drop of the in-vehicle acceleration sensor has been detected immediately before the impact (Step S801).

If the occurrence of the drop of the in-vehicle acceleration sensor is detected immediately before the impact (YES in Step S801), the impact cause determination unit 1104 determines that the cause of the impact is the drop of the in-vehicle acceleration sensor, and the confirmation information output processing unit 1107 outputs confirmation information including information regarding confirmation as to whether or not to issue a notification (Step S802).

When the response information acquisition processing unit 1108 has not acquired the response information including the information regarding the response to the confirmation as to whether or not to make the notification within the predetermined time (NO in Step S803), the processing is terminated. If the response information acquisition processing unit 1108 has acquired response information including information regarding a response to a confirmation as to whether or not to issue a notification (YES in Step S803), the notification processing unit 1106 confirms whether or not the response includes a predetermined response (Step S804).

If the response includes the predetermined response (YES in Step S804), the notification processing unit 1106 issues a notification to the outside (Step S805). If the response is not the predetermined response (NO in Step S504), the process ends.

If the occurrence of the drop of the in-vehicle acceleration sensor has not been detected immediately before the impact (NO in Step S801), the impact cause determination unit 1104 determines that the cause of the impact is an accident of the moving body, and the notification processing unit 1106 issues a notification to the outside (Step S806).

The present invention has been described above with reference to preferred embodiments of the present invention. Although the present invention has been described with reference to specific examples, various modifications and changes can be made to these specific examples without departing from the spirit and scope of the present invention described in the claims.

REFERENCE SIGNS LIST

100 Information processing device
110 Control unit
1101 Acceleration acquisition processing unit
1102 Impact detection unit
1103 Drop detection unit
1104 Impact cause determination unit
1105 Image data acquisition processing unit
1106 Notification processing unit
1107 Confirmation information output processing unit
1108 Response information acquisition processing unit
1109 Message output processing unit
1110 Position information acquisition processing unit
1111 Device activation information acquisition processing unit
1112 Drop information acquisition processing unit
120 Communication unit
130 Acceleration sensor
140 Call unit
150 Image data acquisition unit
160 Output unit
170 Input unit
180 Position information acquisition unit

The invention claimed is:

1. An information processing device attached to a moving body, the information processing device comprising:
- an impact detection unit that detects occurrence of an impact in the information processing device;
- an impact cause determination unit that determines a cause of the impact;
- a drop detection unit that detects occurrence of a drop of the information processing device; and
- a notification processing unit that issues a notification to outside of the moving body,
- wherein the impact cause determination unit is configured to determine that the cause of the impact is an accident of the moving body when occurrence of the drop of the information processing device is not detected immediately before occurrence of the impact,
- the notification processing unit issues the notification regarding the impact when the impact cause determination unit determines that the cause of the impact is an accident of the moving body, and
- the notification processing unit issues no notification regarding the impact when the drop detection unit detects that the cause of the impact is the drop of the information processing device.

2. The information processing device according to claim 1, wherein the impact cause determination unit determines that the cause of the impact is the drop of the information processing device when occurrence of the drop of the information processing device is detected immediately before the occurrence of the impact.

3. An information processing device attached to a moving body, the information processing device comprising:
- an impact detection unit that detects occurrence of an impact in the information processing device;
- an impact cause determination unit that determines a cause of the impact;
- a drop detection unit that detects occurrence of a drop of the information processing device; and
- a notification processing unit that issues a notification to outside of the moving body, and
- a response information acquisition processing unit that acquires information regarding a response to the confirmation, wherein
- when the response includes a predetermined response, the notification processing unit performs notification in response to the response.

4. An information processing method executed by an information processing device attached to a moving body, the information processing method comprising:
- an impact detection step of detecting occurrence of an impact in the information processing device;
- an impact cause determination step of determining a cause of the impact;
- a drop detection step of detecting a drop of the information processing device; and
- a notification processing step of issuing a notification to outside of the moving body, wherein
- the impact cause determination step includes determining that the cause of the impact is an accident of the moving body when occurrence of the drop of the information processing device is not detected immediately before occurrence of the impact,
- the notification processing step includes issuing the notification regarding the impact when the impact cause determination step determines that the cause of the impact is an accident of the moving body, and the notification processing step issues no notification regarding the impact when the drop detection step detects that the cause of the impact is the drop of the information processing device.

5. A non-transitory computer-readable storage medium storing a program that causes a computer to execute the information processing method according to claim 4.

* * * * *